United States Patent
Nishimoto

(10) Patent No.: US 6,605,884 B2
(45) Date of Patent: Aug. 12, 2003

(54) BICYCLE HUB AXLE HAVING A DYNAMO THEREON

(75) Inventor: Naohiro Nishimoto, Wakayama (JP)

(73) Assignee: Shimano, Inc., Osaka (JP)

( * ) Notice: Subject to any disclaimer, the term of this patent is extended or adjusted under 35 U.S.C. 154(b) by 134 days.

(21) Appl. No.: 09/876,338

(22) Filed: Jun. 7, 2001

(65) Prior Publication Data

US 2002/0185909 A1 Dec. 12, 2002

(51) Int. Cl.[7] .......................... H02K 11/00; H02K 7/00; B60B 27/00; B60B 35/00; B60B 37/00
(52) U.S. Cl. ................. 310/67 A; 301/110.5; 301/124.1
(58) Field of Search .................... 310/67 A; 301/6.5, 301/6.9, 110.5, 110.6, 124.1

(56) References Cited

U.S. PATENT DOCUMENTS

| | | | |
|---|---|---|---|
| 2,104,707 A | * 1/1938 | Rawlings | 310/66 |
| 4,559,462 A | * 12/1985 | Hernandez-Badillo | 310/67 A |
| 5,828,145 A | * 10/1998 | Nakamura | 310/67 A |
| 6,093,985 A | * 7/2000 | Chen | 310/67 A |
| 6,278,216 B1 | * 8/2001 | Li | 310/254 |
| 6,409,197 B1 | * 6/2002 | Endo et al. | 280/288.4 |

* cited by examiner

Primary Examiner—S. Joseph Morano
Assistant Examiner—Jason R. Bellinger
(74) Attorney, Agent, or Firm—Jeffer, Mangels, Butler & Marmaro LLP

(57) ABSTRACT

A bicycle dynamo hub axle assembly that includes an axle having opposite ends, a smaller diameter portion located at one of said opposite ends, and a larger diameter portion, an electricity generating device disposed on the larger diameter portion of the axle, a bearing race disposed on the larger diameter portion, an electric wire extending from the electricity generating device, through one of the grooves and through the bearing race, a spacer disposed on the larger diameter portion, and a lock nut disposed on the smaller diameter portion for securing the bearing race and the spacer in position. The smaller diameter portion has a smaller diameter than the larger diameter portion and the larger diameter portion has at least two grooves defined therein. The larger diameter portion also includes a stepped portion extending radially outwardly therefrom. The spacer has an opening defined therethrough, and has at least one tongue extending inwardly into the opening. The tongue is received in one of the grooves, thereby preventing the spacer from rotating.

30 Claims, 8 Drawing Sheets

BICYCLE HUB AXLE HAVING A DYNAMO THEREON

FIELD OF THE INVENTION

The present invention relates generally to bicycle hub axles, and more particularly to a bicycle hub axle having a dynamo thereon.

BACKGROUND OF THE INVENTION

Referring to FIGS. 1–2, to prevent the necessity of batteries, bicycles often employ some type of electricity generating device to power a lamp, such as a headlight, taillight or the like. In the past, a dynamo 106 disposed on the axle 108 and inside the hub shell of the bicycle has been used to generate the necessary power. However, those skilled in the art have encountered difficulties in assembling the components of the axle and dynamo.

The axle 108 includes a groove 112 that extends axially along both a smaller diameter portion 114 and a larger diameter portion 116 of the axle 108. A cone 118 is threaded onto the larger diameter portion 116 and abuts a nut 120 that holds the stator yoke 122 of the dynamo 106 in place. A spacer 124 is fitted on the axle 108 behind the cone 118. The spacer 124 includes a single tongue 126 extending downwardly into an opening in the center thereof. The tongue 126 is fitted in groove 112 to prevent the tongue 126 from rotating about the axle 108. A connector housing 128 having an electrical connector 130 therein is fitted on the axle 108 behind the spacer 124. The electrical connector 130 is electrically communicated to the dynamo 106 by a wire 131. An insulation plate 132, ground plate 134 and lock nut 136 finish the assembly and lock the components onto the axle 108.

One of the problems encountered with the prior art is that electrical wire 131 is often damaged during assembly. For example, because of the configuration of the axle 108, the groove 112 has to be machine cut. Machine cut grooves often have burs. A bur can cause two problems. First of all, it may make it difficult to set the cone 118 in the proper location. Secondly, the bur can cause damage to the electrical wire 131.

Another problem is caused by the spacer 124. The tongue 126 on the spacer 124 is typically small and can easily be broken off in groove 112. When this happens, the spacer 124 is free to rotate about axle 108, which often happens when lock nut 136 is tightened against the ground plate 136. Rotation of spacer 124 can cause wire 131 to be damaged and even break.

Accordingly, it is desirable to provide a hub axle having a dynamo thereon that is easy to assembly, that minimizes problems with setting the cone in the proper location and that minimizes occurrences of electrical wire breakage.

SUMMARY OF THE PREFERRED EMBODIMENTS

In accordance with a first aspect of the present invention there is provided a bicycle dynamo hub axle having opposite ends that includes a smaller diameter portion located at one end of the axle, and a larger diameter portion defining an axis. The smaller diameter portion has a smaller diameter than the larger diameter portion, and the larger diameter portion has at least two grooves defined therein that extend in a direction non-parallel to the rotational direction of the axle. In a preferred embodiment, the larger diameter portion includes a stepped portion extending radially outwardly therefrom and a portion of the grooves extends into the stepped portion. The larger diameter portion includes a groove inner diameter that is larger than the diameter of the smaller diameter portion.

In accordance with another aspect of the present invention there is provided a bicycle dynamo hub axle assembly that includes an axle having opposite ends, a smaller diameter portion located at one of said opposite ends, and a larger diameter portion, an electricity generating device disposed on the larger diameter portion of the axle, a bearing race disposed on the larger diameter portion, an electric wire extending from the electricity generating device, through one of the grooves and through the bearing race, a spacer disposed on the larger diameter portion, and a lock nut disposed on the smaller diameter portion for securing the bearing race and the spacer in position. The smaller diameter portion has a smaller diameter than the larger diameter portion and the larger diameter portion has at least two grooves defined therein. The larger diameter portion also includes a stepped portion extending radially outwardly therefrom. The spacer has an opening defined therethrough, and has at least one tongue extending inwardly into the opening. The tongue is received in one of the grooves, thereby preventing the spacer from rotating.

In accordance with yet another aspect of the present invention there is provided a bicycle dynamo hub axle assembly including an axle having opposite ends that includes a smaller diameter portion located at one of the ends and a larger diameter portion located inboard of the smaller diameter portion, a washer, an electricity generating device disposed on the larger diameter portion of the axle, a cone having a non-threaded interior disposed on the larger diameter portion, a spacer disposed on the larger diameter portion, an electric wire extending from the electricity generating device, and a lock nut disposed on the smaller diameter portion for securing the cone and spacer in position. The smaller diameter portion has a smaller diameter than the larger diameter portion and the larger diameter portion has four grooves defined therein that extend in an axial direction. The grooves are spaced circumferentially around the larger diameter portion approximately equidistance apart. The larger diameter portion also has a stepped portion extending radially outwardly therefrom. A portion of the grooves extends into the stepped portion. The grooves also include an open end opposite the portion of the groove that extends into the stepped portion. The larger diameter portion also includes a recess defined therein. The washer is disposed in the recess and the opening is formed transversely therethrough at a location adjacent one of the grooves. The cone is disposed outboard of the electricity generating device and the washer and has four protrusions extending axially inwardly therefrom. The four protrusions are received in the portion of the grooves defined in the stepped portion, thereby preventing the cone from rotating on the axle. The spacer has three tongues that extend radially inwardly into an opening defined therethrough. The tongues are received in three of the grooves defined in the larger diameter portion, thereby preventing the spacer from rotating. The electric wire extends through the opening in the washer throughone of the grooves and through the cone.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
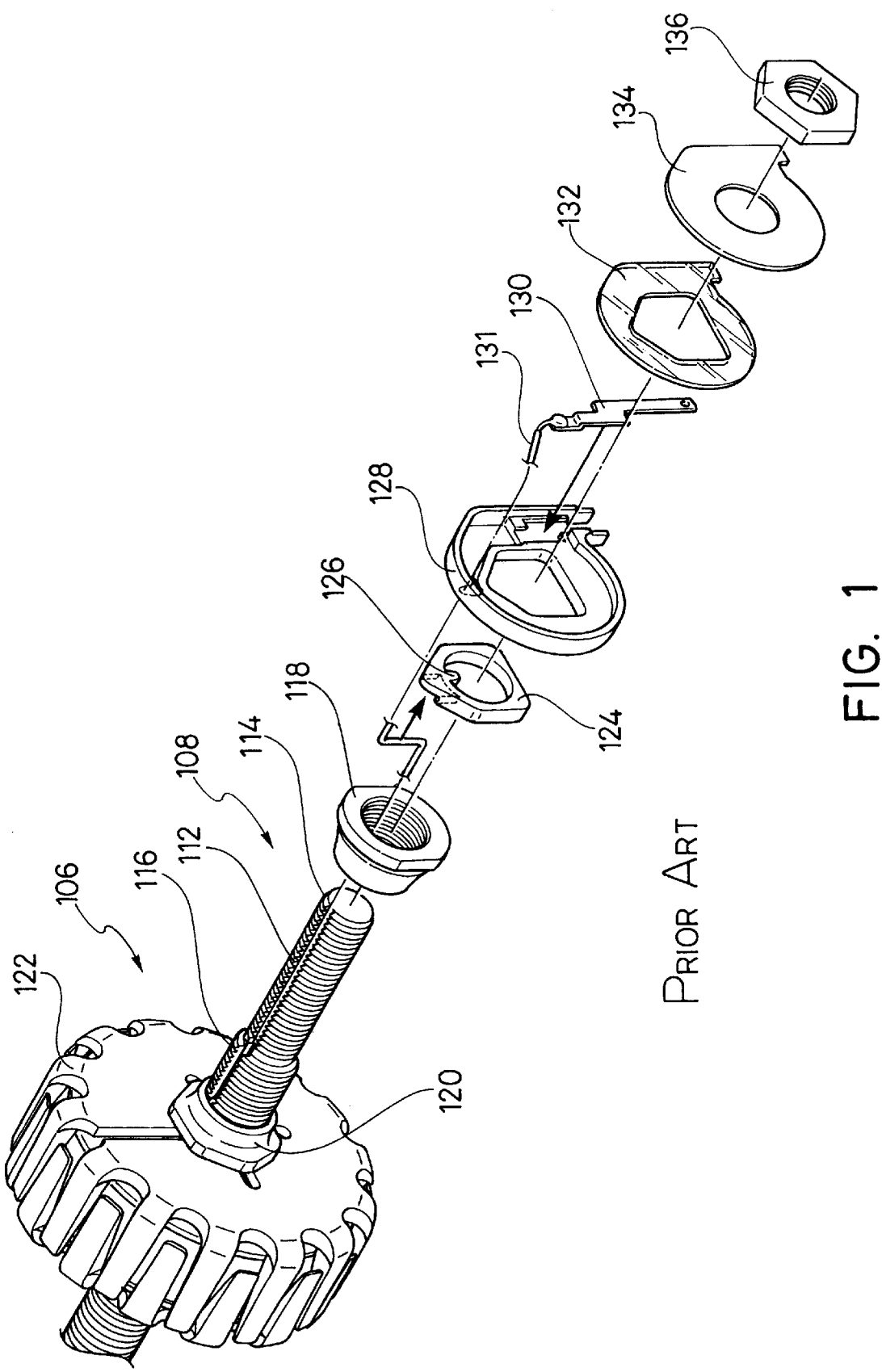
FIG. 1 is an exploded perspective view of a prior art hub axle assembly having a dynamo thereon.

The present invention provides for a bicycle hub axle assembly 10. The assembly includes an axle 12 having opposite right and left ends 12a, 12b. The right end 12a of the axle includes a smaller diameter portion 14 and a larger diameter portion 16. The axle 12 also includes an electricity generating device, such as a dynamo 106, seated near the center thereof. It will be appreciated that terms such as "left", "right", "top", "bottom", "inwardly", "outwardly", "front", "inner", "up", and "down" and other positionally descriptive terms used hereinbelow are used merely for ease of description and refer to the orientation of the components as shown in the Figures. It should be understood that any orientation of the elements described herein is within the scope of the present invention.

Figure 2:
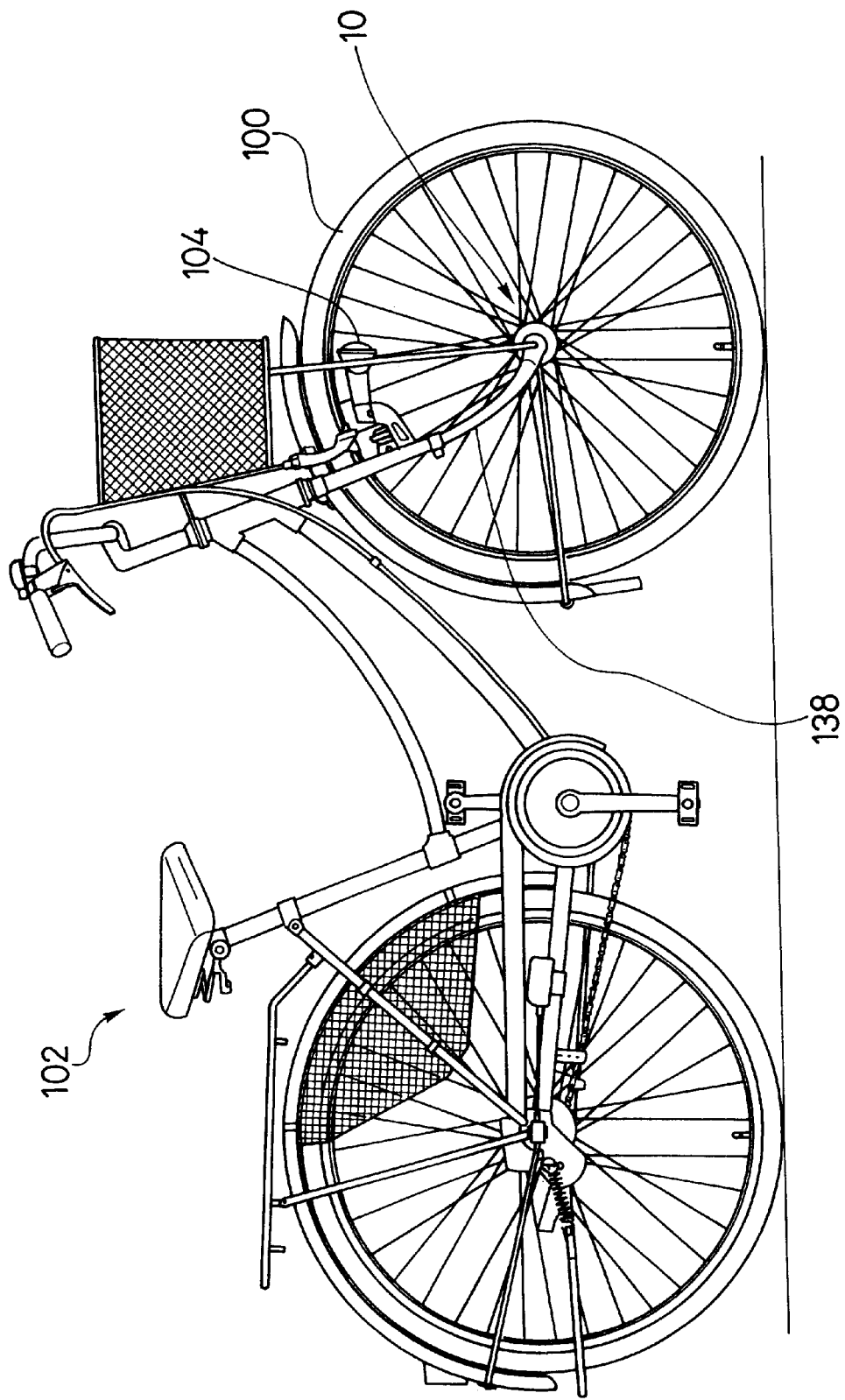
FIG. 2 is a side elevation of a bicycle having a hub axle assembly with a dynamo thereon in accordance with a preferred embodiment of the present invention.

As shown in FIG. 2, the hub axle assembly 10 can be used on the front wheel 100 of a bicycle 102 for powering a lamp 104 or the like. It will be understood that the assembly 10 can also be used on the back wheel of a bicycle or any of the wheels on a tricycle, or other wheeled mobile, etc.

Figure 3:
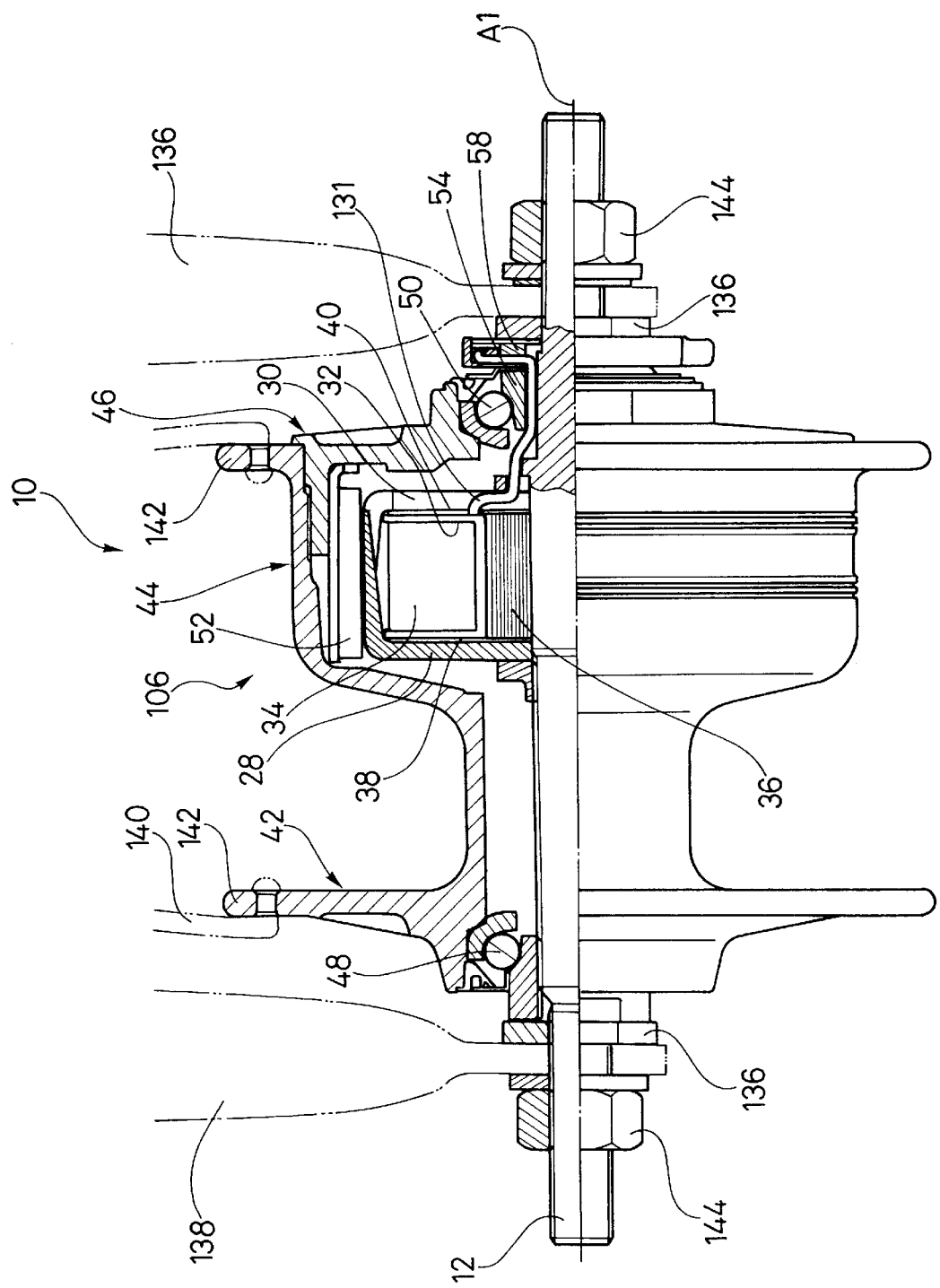
FIG. 3 is a partial cross-sectional rear elevational view of a hub axle assembly including a dynamo in accordance with a preferred embodiment of the present invention.
Figure 4:
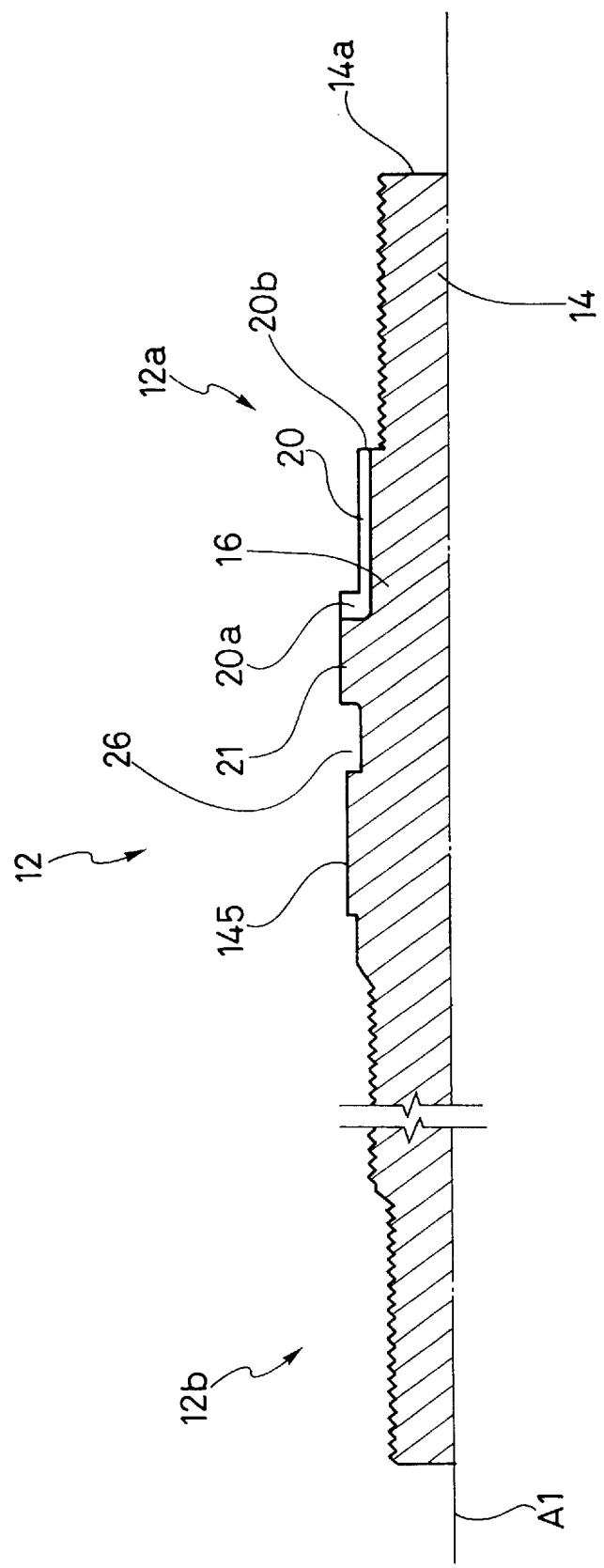
FIG. 4 is a cross-sectional rear elevational view of the axle of the assembly of FIG. 3.

The hub axle assembly 10 is integrated into the hub of the front wheel 100 of the bicycle 102. More specifically, the two ends 12a, 12b of the hub axle 12 are fixed to the right and left front-wheel forks 138, and spokes 140 are fixed to the two flanges 142 of an external rotor assembly. The axis A1 shown in FIG. 3 is the axis of rotation of the front wheel 100 of the bicycle, and the external rotor assembly rotates together with the front wheel 100 about the axis A1.

Referring to FIGS. 3–6, the smaller diameter portion 14 of the right end 12a of the axle 12 is threaded and has a smaller diameter than the larger diameter portion 16, which is preferably non-threaded. However, in an alternative embodiment, the larger diameter portion 16 may be threaded. The smaller diameter portion 14 includes a terminal end 14a that extends away from the larger diameter portion 16, which is located inboard of the smaller diameter portion 14. The larger diameter portion 16 preferably has four grooves 20 formed therein. In a preferred embodiment, the grooves 20 are arranged circumferentially around the outside of the larger diameter portion 16 and are spaced approximately equidistance apart. The larger diameter portion 16 has a diameter that is large enough so that even with the four grooves 20 defined therein, the axle 12 still has sufficient strength to withstand the normal wear and tear of bicycle use. The diameter of the grooves is referred to herein as the groove inner diameter D1 (see FIG. 6). Preferably, the groove inner diameter D1 is larger than the diameter of the smaller diameter portion 14. Preferably the groove inner diameter is approximately 9 mm and the radius R1 of the grooves is approximately 1.5 mm.

Figure 5:
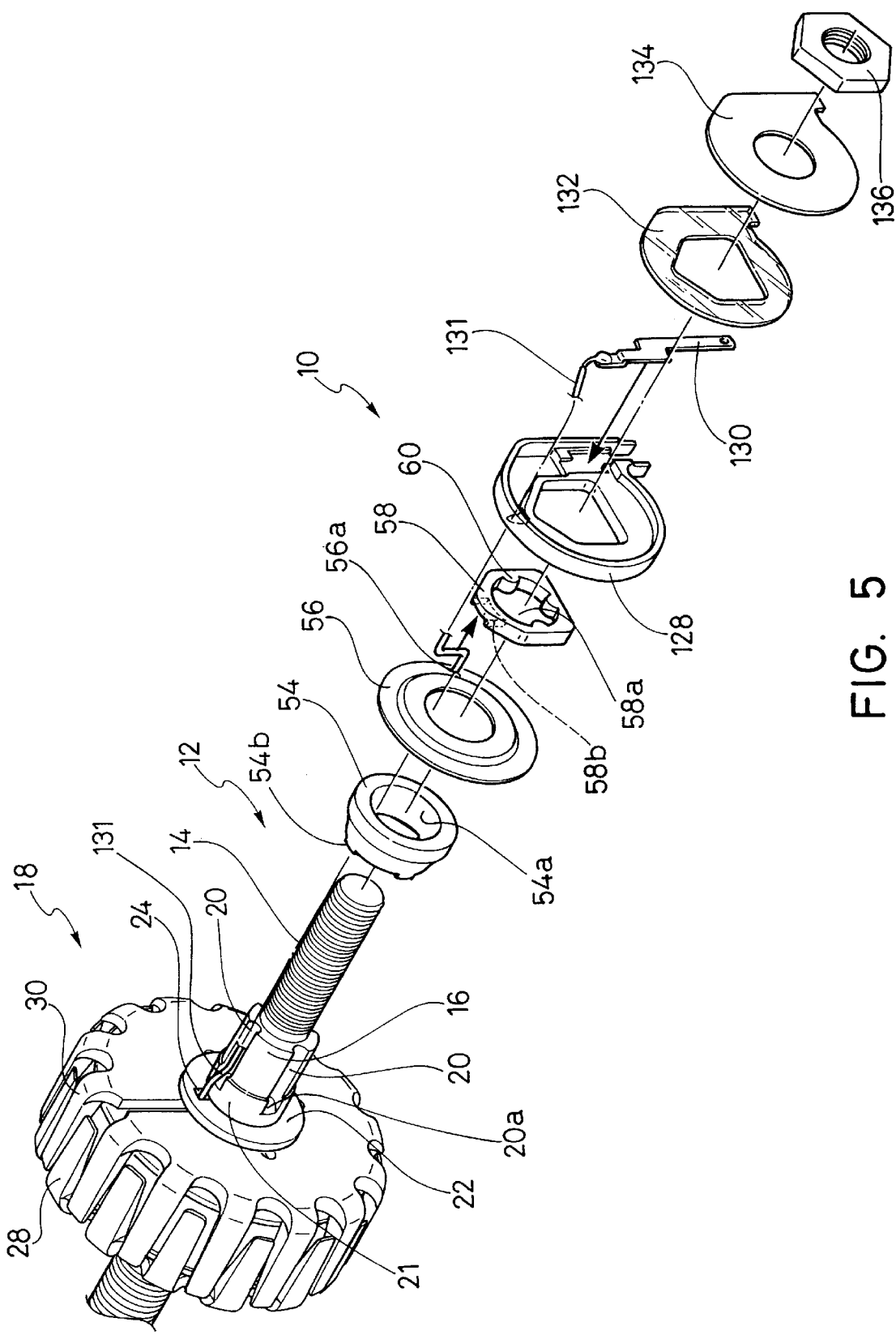
FIG. 5 is an exploded perspective view of the hub axle assembly of FIG. 3.
Figure 6:
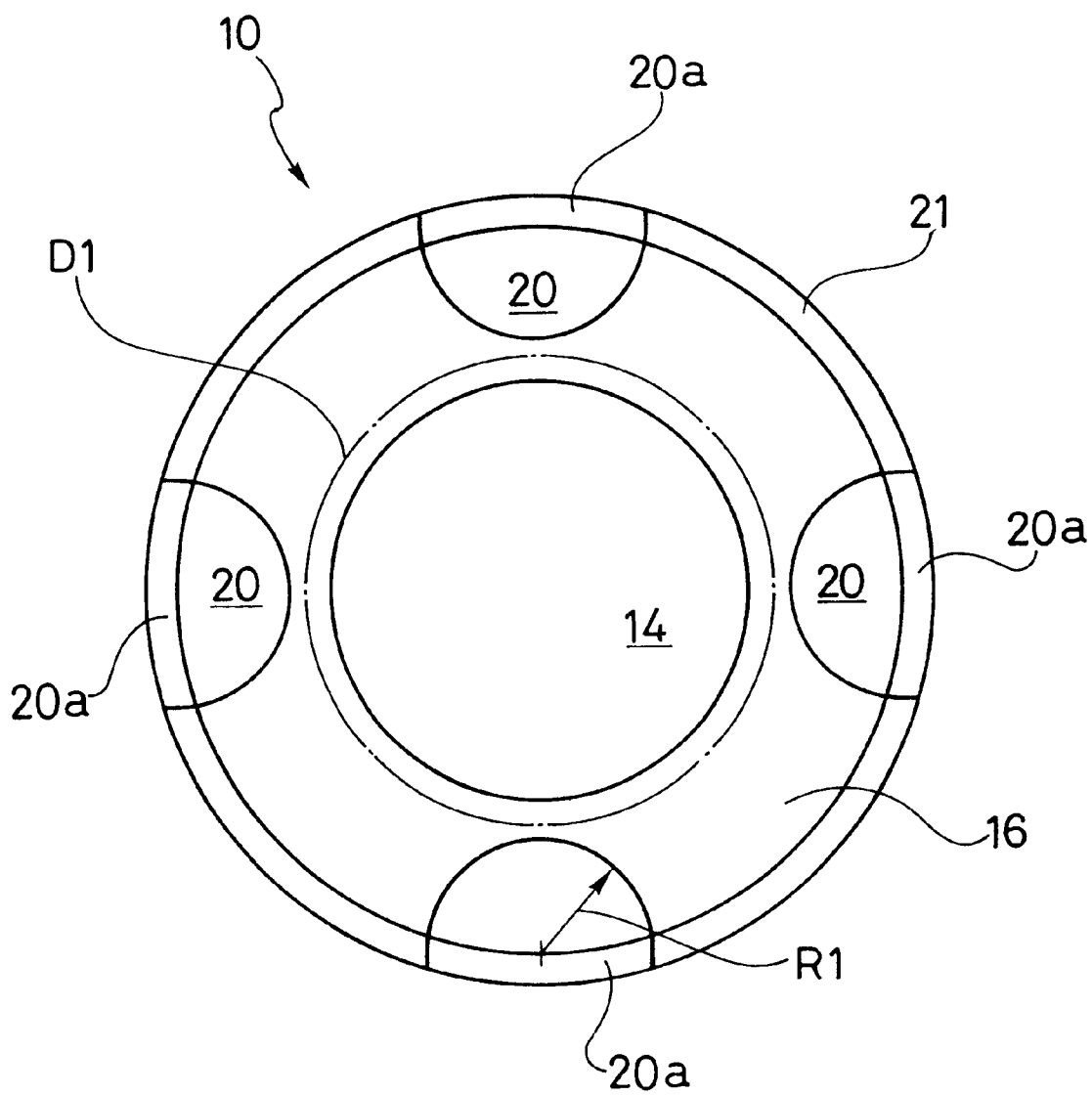
FIG. 6 is an end elevational view of the axle of the assembly of FIG. 3 showing the groove inner diameter D1.

The larger diameter portion 16 also includes a stepped portion 21 into which a portion 20a of the grooves 20 extend. The opposite end of the grooves 20 defines an open end 20b where the larger diameter portion 16 steps down to the smaller diameter portion 14. The stepped portion 21 acts as a seat for the right cone 54, when the cone 54 is abutted thereagainst, which is described below. The axle 12 also includes a washer 22 thereon that has an opening 24 defined therein through which the electric wire 131 extends. The washer 22 is located slightly inboard of the stepped portion 21 and the grooves 20, as is shown in FIG. 5 and is seated in an annular recess 26 defined in the larger diameter portion 16 between the stepped portion 21 and a plurality of protrusions or splines 145 that prevent the dynamo 106 from rotating on the axle 12. The washer 22 also adds strength to the assembly and prevents the deformation of the stator yoke 122. As described below, the electric wire 131 communicates the electrical connector 130 and the dynamo 106.

The hub axle 12 is preferably made of a rigid metal, such as steel, and is formed by a cold forging process. The threads of the smaller diameter portion 14 and the left end 12b are later machine cut or are formed by a rolling process. This enables the grooves 20 to be formed by a process that prevents burs from forming as is typical in the prior art when the groove is machine cut. This minimizes occurrences of damage to the electrical wire 131.

The hub dynamo 106 comprises an internal stator assembly and an external rotor assembly. The internal stator assembly (internal stator) comprises, as shown in FIG. 3, the hub axle 12, two stator yokes 28 and 30, a bobbin 32 with a wound coil 34, a square shaped core yoke 36, and two separation disks 38 and 40 integrated as shown in FIG. 3. The internal stator is fixed to the front wheel forks 138 by clamp nuts 144 or lock nuts 136, and the stator yokes 28 and 30, cylindrical core yoke 36, and separation disks 38 and 40 are fixed to the axle 12 by splines 145. In a preferred embodiment, the axle 12 includes four splines 145.

The external rotor assembly (external rotor) comprises a first frame 42, a second frame 44, and a cap 46 integrated as shown in FIG. 3. The integrated external rotor assembly is rotatably fixed to the axle 12 with the aid of a bearings 48 and 50. A permanent magnet 52 comprising four magnets spaced at equal intervals in the circumferential direction is fixed to the cap 46, as shown in FIG. 3. In this permanent magnet 52, N and S poles are intermittently formed at equal intervals, and a total of 28 poles of each type face the yokes (pole shoes) 28b and 30b of the stator yokes 28 and 30.

Figure 7:
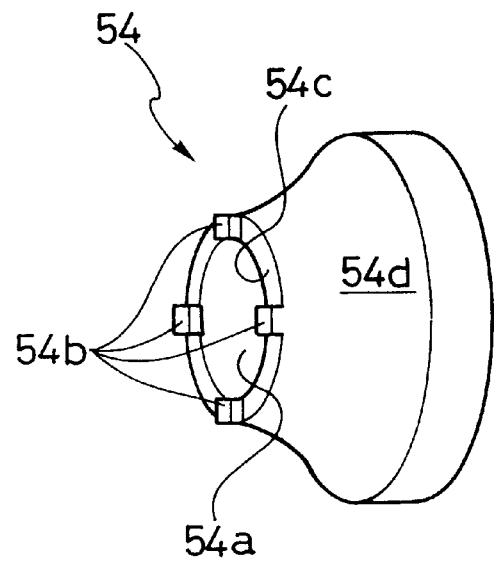
FIG. 7 is a perspective view of the right cone of the hub axle assembly of FIG. 3 showing the projections extending axially inwardly.
Figure 8:
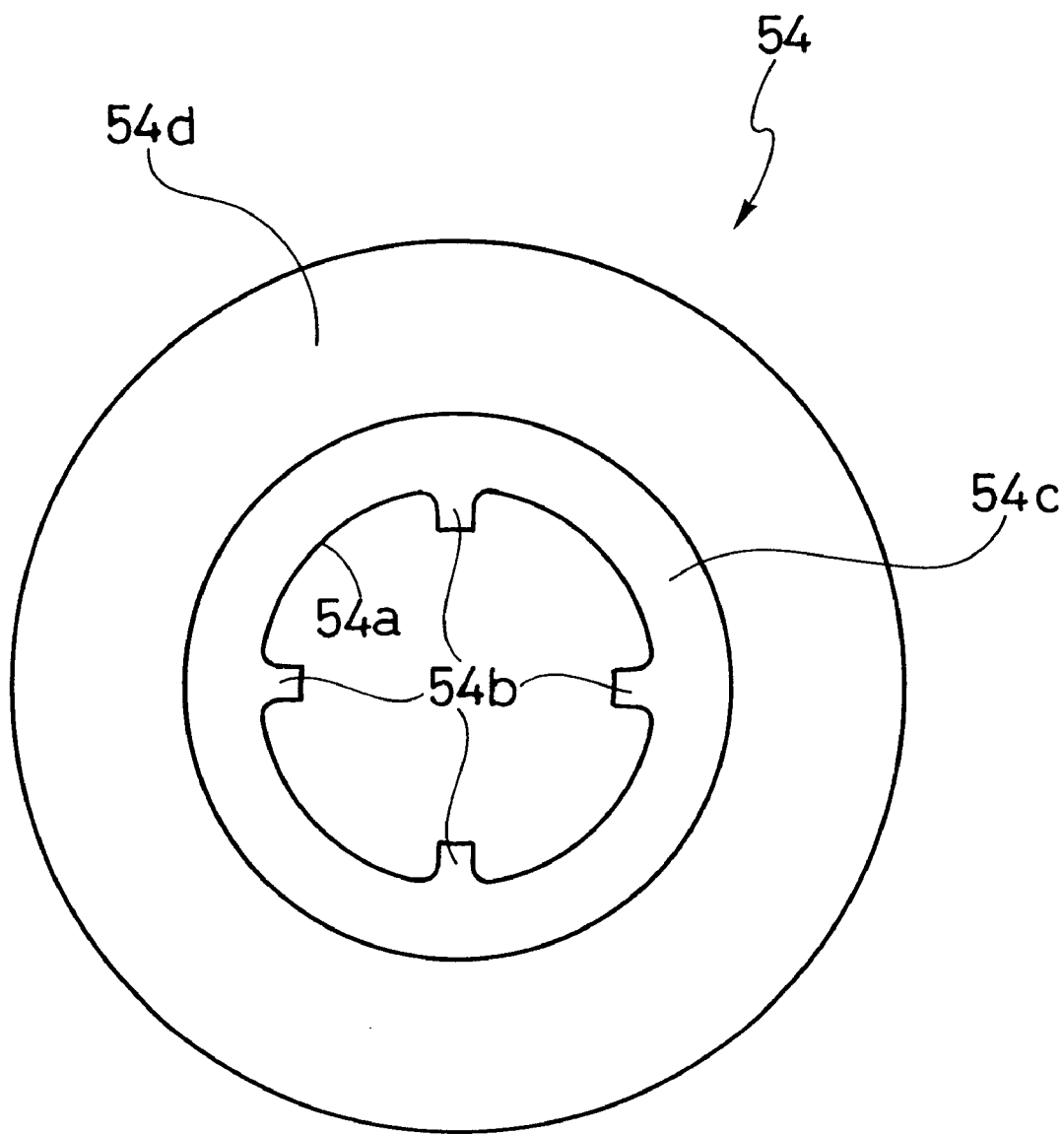
FIG. 8 is a front elevational view of the right cone showing the projections extending radially inwardly in accordance with another preferred embodiment of the present invention.

The right cone 54 (best shown in FIG. 7) is received on the axle 12 and is fitted over the larger diameter portion 16 and abuts the stepped portion 21. The cone 54 has an inner surface 54a that is non-threaded. Typically, as discussed above (see FIG. 1), a cone 118 is threaded onto the axle 108. However, cone 54 has four projections 54b that extend axially inwardly and are received in the portion 20a of the grooves 20 that is defined in the stepped portion 21 (referred to herein as groove portion 20a). Because the projections 54b are received in groove portion 20a and the front surface 54c of the cone 54 abuts the stepped portion 21, the right cone 54 is held firmly in place after the remaining components are secured on the axle 12 behind the cone 54. As shown in FIG. 8, in another preferred embodiment, the projections 54b can extend radially inwardly. In yet another embodiment, the projections 54b may extend radially inwardly and axially inwardly. Right cone 54 also includes a bearing surface 54d on which bearing 50 rides. It will be understood that the cone 54 can be any bearing race. For example, a cartridge type bearing may replace cone 54.

Figure 9:
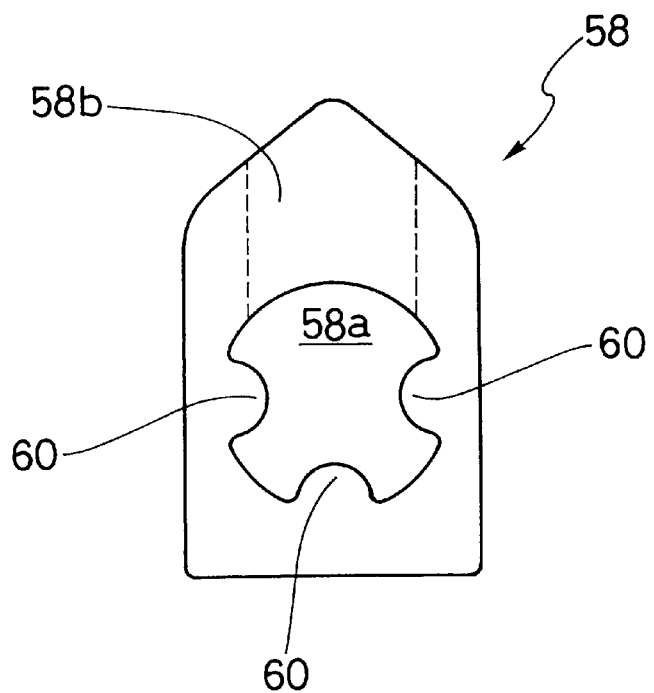
FIG. 9 is a rear elevational view of the spacer of the hub axle assembly of FIG. 3 showing the tongues and the stepped portion.

An annularly shaped seal 56 is received on the axle 12 behind the cone 54. The seal 56 has an opening 56a defined therein through which the wire 131 extends. A spacer 58 having an opening 58a defined transversely therethrough is disposed on the axle 12 behind the seal 56. As shown in FIG. 9, in a preferred embodiment, the spacer 58 includes three tongues 60 extending radially inwardly into opening 58a. When spacer 58 is disposed on axle 12, the tongues 60 are received in grooves 20, thereby preventing spacer 58 from rotating on the larger diameter portion 16. The open end 20b of the grooves 20 receives the tongues 60 of the spacer 58 when the spacer 58 is slid onto the larger diameter portion 16 of the axle 12. It will be understood that different numbers of tongues 60 may be provided on the spacer 58. The tongues 60 are also generally bigger than those in the prior art (for example, tongue 126 of spacer 124, shown in FIG. 1)

The spacer 58 includes a stepped portion or recess 58b which supports and contains the electric wire 131 when assembled. As the wire 131 passes out of the opening in the cone 54, the wire 131 must make its way over the spacer 58. Recess 58b provides a space, once the assembly is fitted tightly together, for the wire 131 to go over the spacer without being pinched between the spacer 58 and the cone 54. As can be seen in FIG. 5, the electric wire 131 bends after it comes out of the center of the cone 54, runs up through recess 58b and then over the spacer 58 on its way to the electrical connecter 130. In a preferred embodiment, the recess 58b has a width of approximately 5 mm.

A connector housing 128 having an electrical connector 130 therein is fitted on the axle 12 behind the spacer 58. The electrical connector 130 is electrically communicated to the dynamo 106 by wire 131. An insulation plate 132, ground plate 134 and lock nut 136 finish the assembly 10 and lock the components onto the axle 12.

The embodiments of the present invention recited herein are intended to be merely exemplary and those skilled in the art will be able to make numerous modifications to them without departing from the spirit of the present invention. All such modifications are intended to be within the scope of the present invention as defined by the claims appended hereto.

What is claimed is:

1. A bicycle dynamo hub axle having opposite ends, said axle comprising:
   a) a smaller diameter portion located at one end of said axle, and
   b) a larger diameter portion defining an axis, wherein said smaller diameter portion has a smaller diameter than said larger diameter portion, wherein said larger diameter portion has at least two grooves defined therein that extend in a direction non-parallel to the rotational direction of said axle, wherein said larger diameter portion includes a groove inner diameter, and wherein said groove inner diameter is larger than said diameter of said smaller diameter portion.

2. The bicycle dynamo hub axle of claim 1 wherein said smaller diameter portion is threaded and wherein said larger diameter portion is non-threaded.

3. The bicycle dynamo hub axle of claim 2 wherein said grooves extend in a direction substantially parallel to said axis.

4. The bicycle dynamo hub axle of claim 2 wherein said larger diameter portion is located inboard of said smaller diameter portion.

5. The bicycle dynamo hub axle of claim 2 wherein said larger diameter portion includes a stepped portion extending radially outwardly therefrom, wherein a portion of said grooves extends into said stepped portion.

6. The bicycle dynamo hub axle of claim 5 wherein said grooves include an open end opposite said portion of said groove that extends into said stepped portion.

7. A bicycle dynamo hub axle having opposite ends, said axle comprising:
   a) a smaller diameter portion located at one end of said axle, wherein said smaller diameter portion is threaded, and
   b) a larger diameter portion defining an axis, wherein said larger diameter portion is non-threaded, wherein said smaller diameter portion has a smaller diameter than said larger diameter portion, wherein said larger diameter portion has at least two grooves defined therein that extend in a direction non-parallel to the rotational direction of said axle, wherein said larger diameter portion includes a stepped portion extending radially outwardly therefrom, wherein a portion of said grooves extends into said stepped portion, and wherein said stepped portion includes a recessed portion adjacent thereto.

8. A bicycle dynamo hub axle having opposite ends, said axle comprising:
   a) a smaller diameter portion located at one end of said axle, and
   b) a larger diameter portion defining an axis, wherein said smaller diameter portion has a smaller diameter than said larger diameter portion, wherein said larger diameter portion has at least four grooves defined therein that extend in a direction non-parallel to the rotational direction of said axle, wherein said larger diameter portion includes a stepped portion extending radially outwardly therefrom, wherein a portion of said grooves extends into said stepped portion, wherein said grooves include an open end opposite said portion of said groove that extends into said stepped portion, and wherein said smaller diameter portion is threaded and wherein said larger diameter portion is non-threaded.

9. The bicycle dynamo hub axle of claim 8 wherein said grooves are arranged circumferentially around said larger diameter portion, and wherein said four grooves are spaced approximately equidistant from one another.

10. The bicycle dynamo hub axle of claim 1 further comprising an electricity generating device disposed on said larger diameter portion.

11. The bicycle dynamo hub axle of claim 7, further comprising at least one protrusion extending outwardly therefrom, wherein said recess is defined between said protrusion and said stepped portion.

12. The bicycle dynamo hub axle of claim 6 further comprising four protusions arranged circumferentially around said larger diameter portion, wherein said four protrusions are spaced approximately equidistant from one another.

13. A bicycle dynamo hub axle assembly comprising:
a) an axle having opposite ends, said axle including
   i) a smaller diameter portion located at one of said ends, and
   ii) a larger diameter portion, wherein said smaller diameter portion has a smaller diameter than said larger diameter portion, wherein said larger diameter portion has at least two grooves defined therein, and wherein said larger diameter portion includes a stepped portion extending radially outwardly therefrom,
b) an electricity generating device disposed on said larger diameter portion of said axle,
c) a bearing race disposed on said larger diameter portion,
d) an electric wire extending from said electricity generating device, through one of said grooves and through said bearing race,
e) a spacer disposed on said larger diameter portion, said spacer having an opening defined therethrough, and having at least one tongue extending inwardly into said opening, wherein said tongue is received in one of said grooves, thereby preventing said spacer from rotating, and
f) a lock nut disposed on said smaller diameter portion for securing said bearing race and said spacer in position.

14. The assembly of claim 13 wherein said smaller diameter portion is threaded, and wherein said larger diameter portion is non-threaded.

15. The assembly of claim 13 wherein said bearing race comprises a cone.

16. The assembly of claim 15 wherein said larger diameter portion has at least four grooves defined therein that extend in an axial direction.

17. The assembly of claim 16 wherein said grooves are arranged circumferentially around said larger diameter portion, and wherein said four grooves are spaced approximately equidistant from one another.

18. The assembly of claim 16 wherein said spacer has at least three tongues extending inwardly into said opening, wherein said at least three tongues are received in a corresponding number of said grooves.

19. The assembly of claim 18 wherein said wire is disposed in one of said grooves, and said tongues are disposed in the other grooves.

20. The assembly of claim 16 wherein said larger diameter portion is disposed inboard of said smaller diameter portion, and wherein said cone has a non-threaded interior.

21. The assembly of claim 13 further comprising a washer, wherein said larger diameter portion includes a recess defined between said stepped portion and at least one protrusion extending radially outwardly from said larger diameter portion, wherein said washer is disposed in said recessed portion, and wherein said washer has an opening formed transversely therethrough at a location adjacent said stepped portion, and wherein said wire extends through said opening.

22. The assembly of claim 16 wherein a portion of said grooves extends into said stepped portion.

23. The assembly of claim 22 wherein said cone has at least one protrusion extending radially inwardly therefrom, and wherein said at least one protrusion is received in at least one of said grooves, thereby preventing said cone from rotating on said axle.

24. The assembly of claim 22 wherein said cone has at least one protrusion extending axially inwardly therefrom, and wherein said at least one protrusion is received in at least one of said grooves, thereby preventing said cone from rotating on said axle.

25. The assembly of claim 13 wherein said larger diameter portion includes a groove inner diameter, and wherein said groove inner diameter is larger than said diameter of said smaller diameter portion.

26. The assembly of claim 22 wherein said grooves include an open end opposite said portion of said groove that extends into said stepped portion.

27. The assembly of claim 21 wherein said axle includes four protrusions arranged circumferentially around said larger diameter portion, wherein said four protrusions are spaced approximately equidistant apart from one another.

28. The assembly of claim 25 wherein said grooves have a radius, wherein said groove inner diameter is approximately 9 mm, and wherein said radius is approximately 1.5 mm.

29. The assembly of claim 13 wherein said spacer includes a recess therein.

30. A bicycle dynamo hub axle assembly comprising:
a) an axle having opposite ends, said axle including
   i) a smaller diameter portion located at one of said ends, and
   ii) a larger diameter portion located inboard of said smaller diameter portion, wherein said smaller diameter portion has a smaller diameter than said larger diameter portion, wherein said larger diameter portion has four grooves defined therein that extend in an axial direction, wherein said grooves are spaced circumferentially around said larger diameter portion, and wherein said four grooves are spaced approximately equidistant from one another, wherein said larger diameter portion has a stepped portion extending radially outwardly therefrom, wherein a portion of said grooves extends into said stepped portion, wherein said grooves include an open end opposite said portion of said groove that extends into said stepped portion, and wherein said larger diameter portion includes a recess defined therein,
b) a washer disposed in said recess, wherein said washer has an opening formed transversely therethrough at a location adjacent one of said grooves,
c) an electricity generating device disposed on said larger diameter portion of said axle,
d) a cone having a non-threaded interior disposed on said larger diameter portion, wherein said cone has four protrusions extending axially inwardly therefrom, and wherein said four protrusions are received in said portion of said grooves defined in said stepped portion, thereby preventing said cone from rotating on said axle,
e) an electric wire extending from said electricity generating device, through said opening in said washer, and through one of said grooves and through said cone,
f) a spacer disposed on said larger diameter portion, said spacer having an opening defined therethrough, and having three tongues extending radially inwardly into said opening, wherein said tongues are received in three of said grooves defined in said larger diameter portion, thereby preventing said spacer from rotating, and
g) a lock nut disposed on said smaller diameter portion for securing said cone and spacer in position.

* * * * *